(12) United States Patent
Rees (10) Patent No.: US 11,995,875 B2
(45) Date of Patent: May 28, 2024

(54) BOOM MOUNTED AGRICULTURAL MACHINE VISION PERSPECTIVE CORRECTION

(71) Applicant: UNIVERSITY OF SOUTHERN QUEENSLAND, Toowomba (AU)

(72) Inventor: Steven Rees, Top Camp (AU)

(73) Assignee: UNIVERSITY OF SOUTHERN QUEENSLAND, Toowoomba (AU)

( * ) Notice: Subject to any disclaimer, the term of this patent is extended or adjusted under 35 U.S.C. 154(b) by 394 days.

(21) Appl. No.: 17/417,707

(22) PCT Filed: Jan. 30, 2020

(86) PCT No.: PCT/IB2020/050759
§ 371 (c)(1),
(2) Date: Jun. 23, 2021

(87) PCT Pub. No.: WO2020/157702
PCT Pub. Date: Aug. 6, 2020

(65) Prior Publication Data
US 2022/0076387 A1    Mar. 10, 2022

Related U.S. Application Data

(60) Provisional application No. 62/799,622, filed on Jan. 31, 2019.

(51) Int. Cl.
*G06T 7/00* (2017.01)
*A01B 79/00* (2006.01)
(Continued)

(52) U.S. Cl.
CPC .......... *G06V 10/147* (2022.01); *A01B 79/005* (2013.01); *G06T 5/80* (2024.01);
(Continued)

(58) Field of Classification Search
CPC .. G06V 10/147; G06V 10/242; G06V 10/243; G06V 10/32; G06V 20/38;
(Continued)

(56) References Cited

U.S. PATENT DOCUMENTS 9,237,317 B2    1/2016 Hollinger
10,255,670 B1 *  4/2019 Wu ................. H04N 7/183
(Continued)

FOREIGN PATENT DOCUMENTS

EP         2 003 018 A2    12/2008
WO    WO2015/181642 A2    12/2015
(Continued)

OTHER PUBLICATIONS

Canadian Office Action for Canadian Application No. 3,125,889, dated Sep. 29, 2022.
(Continued)

*Primary Examiner* — Ping Y Hsieh
(74) *Attorney, Agent, or Firm* — Birch, Stewart, Kolasch & Birch, LLP (57) ABSTRACT

In an agricultural machine vision system for the selective treatment of a field employing a boom deployed sensor and treatment device, the system utilizes at least one image sensor mounted on the boom to produce base image data. A boom angle detector detects boom height which is used to correct the base image data into remapped image data including a region of interest to produce corrected image data producing a regularized image of the region of interests for treatment, independent of boom tilt.

19 Claims, 8 Drawing Sheets

(51) Int. Cl.
*G06T 5/80* (2024.01)
*G06T 7/70* (2017.01)
*G06V 10/147* (2022.01)
*G06V 10/24* (2022.01)
*G06V 10/32* (2022.01)
*G06V 20/00* (2022.01)

(52) U.S. Cl.
CPC .............. *G06T 7/70* (2017.01); *G06V 10/242* (2022.01); *G06V 10/243* (2022.01); *G06V 10/32* (2022.01); *G06V 20/38* (2022.01); *G06V 10/247* (2022.01)

(58) Field of Classification Search
CPC ...... G06V 10/247; G06V 10/22; G06V 10/25; A01B 79/005; G06T 5/006; G06T 7/70; G06T 2207/30188; A01M 7/0089; A01M 7/0042; G05B 19/18; G05B 2219/40424; G05B 2219/40425; B60R 11/04; G05D 2201/0201; G05D 2201/0202; H04N 23/695
See application file for complete search history.

(56) References Cited

U.S. PATENT DOCUMENTS

| | | |
|---|---|---|
| 2005/0007553 A1 | 1/2005 | Romanoff et al. |
| 2012/0098933 A1 | 4/2012 | Robinson et al. |
| 2013/0204437 A1 | 8/2013 | Koselka et al. |
| 2015/0170400 A1 | 6/2015 | Seitz et al. |
| 2016/0368011 A1* | 12/2016 | Feldhaus ............... B05B 12/124 |

FOREIGN PATENT DOCUMENTS

| | | | |
|---|---|---|---|
| WO | WO2018/154490 A1 | 8/2018 | |
| WO | WO-2018154490 A1 * | 8/2018 | .......... A01M 7/0042 |

OTHER PUBLICATIONS

Extended European Search Report for European Application No. 20748829.7, dated Sep. 13, 2022.
Steven Rees, "Precision weed detection via colour and depth data fusion in real-time for automatic spot spraying", University of Southern Queensland Faculty of Health, Engineering & Sciences, 2015, total of 311 pages.
Examination Report No. 1 for standard patent application issued in corresponding AU Application No. 2020213434 dated Dec. 15, 2021, pp. 1-3.
H. Y. Jeon, "Instrumented Self-Propelled Sprayer to Determine Dynamic Boom Effects on DRoplet Application Uniformity", University of Tennessee, Knoxville, Masters Theses, published Dec. 2003 <URL:https://trace.tennessee.edu/cgi/viewcontent.cgi?article=3376&context=utk_gradthes>, pp. 1-89.
Steven Rees, "Precision weed detection via colour and depth data fusion in real-time for automatic spot spraying", University of Southern Queensland Faculty of Health, Engineering & Sciences, 2015, total of 311 pages.

* cited by examiner

BOOM MOUNTED AGRICULTURAL MACHINE VISION PERSPECTIVE CORRECTION

CROSS REFERENCE TO RELATED APPLICATIONS

This application is the National Phase of PCT International Application No. PCT/IB2020/050759, filed on Jan. 30, 2020, which claims priority under 35 U.S.C. 119(e) to U.S. Provisional Application No. 62/799,622, filed on Jan. 31, 2019, all of which are hereby expressly incorporated by reference into the present application.

FIELD OF THE INVENTION

The present application is directed to perspective correction in agricultural machine vision, particularly that employed on a boom traversing an agricultural field.

BACKGROUND OF THE INVENTION

Modern farming has long used prime movers or tractors to perform various agricultural treatments on an agricultural field or a crop grown in the field, for example, planting, treatment of the field with various substances such as pesticides, herbicides, or supplements, and harvesting of the field. Booms towed or mounted to such a prime mover (tractor) have long been used to increase the treatment area over a single pass. By providing a boom extending orthogonally to the direction of passage of the tractor, the width of a single treatment pass can be substantially increased, thereby decreasing the number of passages required to treat a given agricultural field, and thereby decreasing the time, labor, and costs of such treatment.

Recently, there has been increased interest in machine vision to target such treatments, achieving beneficial results. For example, by targeting the application of herbicides to selectively treat only those specific weeds detected by machine vision, the cost and amount of herbicide utilized for such treatment is dramatically decreased. This has a substantial attendant benefit of reducing the amount of a treatment chemical, through its selective application, thereby reducing not only the costs, but additionally attenuating any adverse environmental effect of such treatment. Consequently, systems such as that disclosed in "METHODS, SYSTEMS, AND DEVICES RELATING TO REAL-TIME OBJECT IDENTIFICATION", U.S. application Ser. No. 15/308,932, filed Nov. 4, 2016, and published as US Patent Publication No. 2017-0071188, on Mar. 16, 2017, by Steven Rees (which is hereby incorporated by reference) have been developed for this purpose.

Applicants have discovered that when machine vision based treatment is performed according to the teachings of the aforementioned application, it is desirable to compensate for perspective variations in machine vision caused by the rocking or angular perturbation of the boom as the tractor proceeds across the field. The surface of the field often has substantial irregularities, which irregularities often cause the angle and distance of the boom from the surface of the field to substantially vary. According to the teachings of the present application, the output of an image sensor or camera mounted to the boom and supplying base image data is corrected by remapping this base image data into corrected image data including a region of interest to correct the base image data into corrected image data which is regularized to compensate for variations in the distance and perspective angle of the region of interest within the camera's field of view which is then used to detect and treat appropriate areas of this region of interest of the field with an applicable treatment device such as s sprayer selectively applying herbicide to weeds present in the field.

Accordingly, the present application is directed to compensation of the machine vision produced by image sensors mounted on the boom of an agricultural treatment device, which enables the corrected image data to be used to precisely identify and treat specific areas within a region of interest of the image sensor. Conventional boom sprayers may utilize a known method of measuring boom height and controlling boom angle using a known ultrasonic height controller.

To accomplish the objectives and solve the technical problems outlined above the present application performs a useful method of treating the images produced by an image sensor provided in an agricultural machine vision system for treatment of an agricultural field using a boom extending away from a tractor and having at least one image sensor mounted on the boom and having a boom angle and boom height susceptible to variation as the agricultural machine travels across a field, the method treating the images produced by the image sensor to simply location of features within a region on interest (ROI) in the field by     ascertaining the boom angle of the boom supporting the image sensor with respect to a field surface of the field;
    receiving base image data from said image sensor;
    correcting the base image data from the image sensor by remapping the base image data into corrected image data including a region of interest (ROI) of said agricultural field to correct for movement of the base image data with respect to location and apparent size of the ROI caused by boom tilt.

The present application further provides a method of treating as described above wherein said correcting may optionally correct the base image data of successive images produced by each said image sensor into corrected image data that is size invariant so that each image represents the ROI with the same pixels of the corrected image data and/or corrects the size and/or perspective of the base image data to produce said corrected image data.

The present application further provides an optional method of treating as described above wherein tilt of the boom as it varies in height with respect to the surface of the field moves the center of the base image data received from the image sensor and correspondingly moves the ROI of the base image data,     the correcting performing remapping of the base image data into corrected image data to place the region of interest (ROI) in a desired location of the corrected image data.

The present application further provides an optional method of treating as described above wherein said ROI is located wholly within said corrected image data by said correcting and/or     wherein said corrected image data is corrected to provide birds eye perspective image data of the ROI representing the image information from the perspective of an infinite distance along a perpendicular from a plane of the field.

The present application further optionally provides a method of treating as described above wherein the image data includes digital pixel image data of pixels in the base image data, the method further characterized in that it     provides said agricultural machine vision system with a perspective map library providing remapping information for remapping pixel information of said base image data for different image sensor mounting angles, perspective change and/or distances between the image sensor and the field surface, the perspective map library including plural correction maps, each correction map providing correction information for a different boom angle, sensor offset angle and/or distance of said image sensor from the field surface.

The present application further optionally provides a method of treating as described above wherein one correction map is selected for each boom angle, sensor offset angle and distance of said image sensor from the field surface and/or
wherein said correction map also corrects for lens distortion.

The present application further optionally provides a method of treating as described above wherein said correcting includes,
selecting a selected correction map having the closest match to the angle determined in said ascertaining;
converting said base image data into corrected image data using said selected correction map.

The present application further optionally provides a method of treating as described above wherein one angle correction map is selected for each different image sensor mounting angle and one boom angle correction map is selected for each boom angle to correct for change in perspective and size caused by the boom orientation.

The present application further optionally provides a method of treating as described above wherein said correcting includes,
selecting a selected boom angle correction map having the closest match to the determined boom angle in said ascertaining,
selecting an angle correction map for the image sensor mounting angle; and
converting said base image data into corrected image data using said selected angle correction map and said boom angle correction map.

The present application further optionally provides a method of treating as described above wherein said converting based on said boom angle correction map is performed to all of the base image data of said base image separately from converting using said angle correction map, and/or
wherein at least one of said boom angle correction map and said angle correction map also corrects for lens distortion.

The present application further optionally provides a method of treating as described above wherein said converting based on said height correction map and said correction based on said angle correction map are performed on a pixel by pixel basis, and/or
wherein said converting includes interpolating the values of nearby pixels of said base image data where a pixel of corrected image data is not directly mapped from the location of a pixel in said base image data.

The present application further optionally provides a method of treating as described above wherein said step of ascertaining is achieved by,
determining height of the boom at two points of the boom, and
calculating the angle of the boom from the height of the boom at said two points.

The present application further provides an agricultural machine vision system for use in treatment of an agricultural field, the agricultural machine vision system being used in agricultural equipment including a treatment boom mounted on a tractor, the boom angle and boom height being susceptible to variation as the agricultural machine travels across a field, including
at least one image sensor mounted on the boom and producing base image data;
a boom angle detector for detecting a boom tilt angle with respect to a field surface of the field;
a processor and memory configured to correct the base image data from the image sensor by remapping the base image data into corrected image data including a region of interest (ROI) of said agricultural field to correct for movement of the base image data with respect to location and apparent size of the ROI caused by boom tilt.

The system describe above further accommodates for tilt of the boom as it varies in height with respect to the surface of the field moves the center of the base image data received from the image sensor and correspondingly moves the ROI of the base image data,
the processor optionally remapping the base image data into corrected image data to place the region of interest (ROI) in a desired location of the corrected image data.

The system described above further optionally corrects said corrected image data to provide birds eye perspective image data of the ROI representing the image information from the perspective of an infinite distance along a perpendicular from a plane of the field.

The system described above further optionally processes the image date including digital pixel image data of pixels in the base image data,
wherein said image sensors are mounted at different image sensor mounting angles with respect to the direction of travel of said tractor to provide a desired offset of said ROI to said boom in the direction of travel;
wherein said memory stores a perspective map library providing remapping information for remapping pixel information of said base image data for different image sensor mounting angles, and perspective change and/or distances between the image sensor and the field surface produced by different tilt angles, the perspective map library including plural correction maps, each correction map providing correction information for a different boom angle, sensor offset angle and/or distance of said image sensor from the field surface.

The system of the present application is further configured to process the method as described above.

The present application will be more fully appreciated with reference to the appended drawings and the detailed description therein which describes various examples of the system of the present application.

BRIEF DESCRIPTION OF THE DRAWINGS

The subject matter of the present application, as defined by the appended claims, is explained in detail in the following detailed description of exemplary embodiments, which is described with reference to the appended drawing figures.

DETAILED DESCRIPTION OF EMBODIMENTS OF THE INVENTION

The present application, including the present detailed description, describes embodiments of the invention recited in the appended claims. However, variations from the embodiments described herein, should be considered to be within the scope of the appended claims as would occur to one of ordinary skill in the art. The present description and the embodiments described describe practical implementations of the invention described in the appended claims. It should be understood, however, that variation to the embodiments disclosed herein are within the scope of the appended claims as would occur to one of ordinary skill in the art.

As already described in the background of the present application, freestanding booms mounted and cantilevered from a prime mover or tractor and extending transversely to the direction of travel of the prime mover are well known and commonly used in field spraying. Such field sprayers may be mounted directly to a prime mover such as a tractor or utility vehicle, may be mounted to a trailer for towing behind a prime mover or tractor, or may, for example, be mounted to a tractor three point hitch, or even the front attachment points of a skip steer, tractor, or the like.

Such field sprayers normally include first and second booms B1 and B2 that pivot from pivot points P1 and P2. Although not essential, such booms are often pivotal by actuators A1 and A2 so that the booms may be pivoted on the pivot points to reduce the amount of space taken by such a boom sprayer, allowing the boom sprayer to be more easily stored and transported through farm gates or the like. Such booms B1 and B2 are normally constructed out of any suitable lightweight and relatively rigid material. Such sprayers typically include plural nozzles spaced along the entire length of the boom for spraying the intended material for dispensing. Conventionally, such boom sprayers are intended to uniformly spray an agricultural field, providing an even coating of the sprayed material across the entire surface of the field. However, according to the teachings of the aforementioned Rees application, there is a recent interest in selective application of such a treatment, by associating selective actuators such as solenoid valves to each of the nozzles, or alternatively, to group the nozzles into small groups, and have an actuator or solenoid valve associated with each small group of nozzles. Such nozzle ends are, according to the teachings of the aforementioned Rees application, normally positioned a suitable distance D1 from the center of the region of interest of their associated camera (e.g. $C_3$) so that the nozzles (at least one of $N_1$ to $N_n$) traverse the region of interest a predetermined distance $D_1$ after the camera.

Figures 1, 1A:
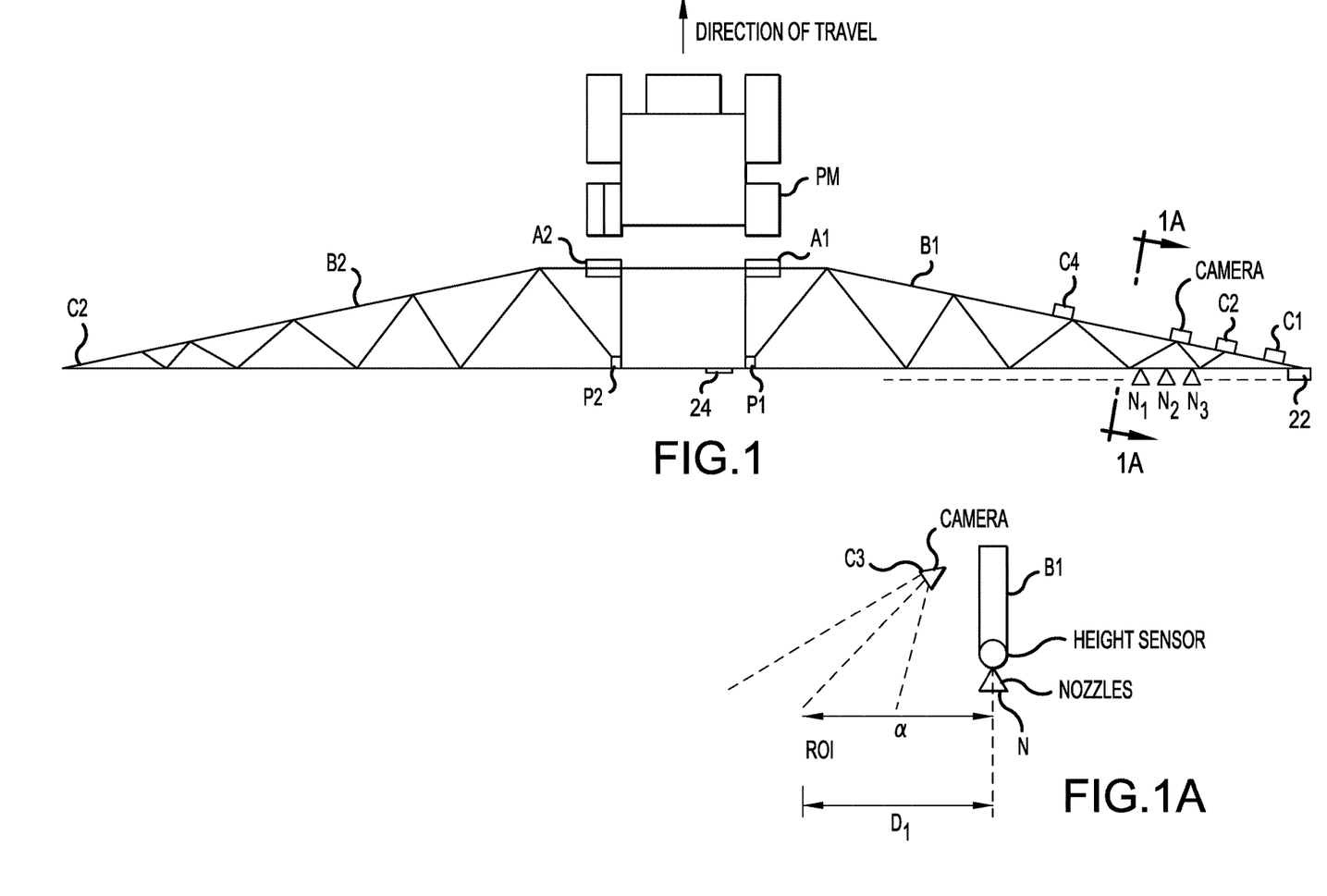
FIG. 1 schematically illustrates a boom mounted to a tractor or prime mover and having sensors, cameras and treatment devices mounted thereon in accordance with the teachings of the present application.
FIG. 1A is a partial schematic end view of the boom of FIG. 1 showing an exemplary camera tilted forward at an angle α in the direction of travel across the field, an exemplary height senor and an exemplary treatment nozzle.

An example of such a configuration is illustrated in FIG. 1 of the present application which discloses a boom sprayer which, while somewhat similar to those known in the prior art, is adapted to the operation described in the present application. In accordance with the teachings of the present application, plural cameras $C_1$-$C_N$ are distributed along the boom, typically at equal spaced distances. Each camera is responsible for a region of interest and is used to produce an image of the region for interest which image is then used according to the teachings of the aforementioned Rees application, to facilitate treatment of the region of interest by one or more sprayers.

In the example illustrated in FIG. 1, each camera is associated with three sprayer nozzles. A greater or fewer number of dispensing nozzles maybe associated with each camera as would occur to one of ordinary skill in the art. It is possible to employ a single nozzle for each camera, or even to associate a different number of nozzles to different cameras on a single boom. In the embodiment of FIG. 1, each camera is associated with three nozzles. For example, camera $C_3$ of FIG. 1 is associated with nozzles $N_1$-$N_3$. In accordance with the teachings of the aforementioned Rees application, the camera region of interest will normally be displaced from the nozzles by distance $D_1$ sufficient to enable the processing of the camera image and the actuation of the nozzle solenoids in accordance with the teachings of the aforementioned Rees application.

FIG. 1 shows a partial sectional view of FIG. 1 through section line 1(a), and illustrates that the region of interest ROI is offset with respect to the central line of the nozzles by a distance D1. This may be accomplished by offsetting the camera with respect to the nozzles or may be accomplished by tilting the camera forwardly at a suitable angle α with respect to the boom such that the region of interest ROI is displaced from the central line of the nozzles by a distance $D_1$. This mounting angle α is typically selected based upon the amount of time needed for processing. For example, if the region of interest is 500 mm in front of the boom and the maximum travel speed is intended to be 20 km/h, then we have a maximum processing time which is the time it takes the boom to travel 500 mm or about 100 ms.

While the camera may be mounted vertically and offset from the sprayer nozzle in the direction of travel by 500 mm, if the camera and sprayer nozzle are physically co-located and both vertical, there will be no time for processing. However, the amount of offset and the angle of the camera or image sensor with respect to the direction of travel is something that may be determined during manufacture. The perspective maps should correspond to the design offset and angle, however, to accommodate the camera angle selected.

It is within the contemplation of the present application that the angle alpha may be any suitable angle, including 0°. However, the center of the region of interest monitored by the camera should preferably be displaced with respect to the central line of the nozzles by a suitable distance $D_1$.

According to the teachings of the afore mentioned Rees application, the distance $D_1$ should be sufficient to enable the complete processing of the region of interest ROI viewed by a camera $C_n$ prior to the passage of this region of interest by the nozzles N. In other words, the travel speed of the prime mover across the field should not be faster than the distance $D_1$ as covered during the time required to process the data concerning the region of interest before it is reached by the center of the nozzle N.

The present application is directed to overcoming a problem encountered when machine vision is utilized on such an agricultural boom. Such an agricultural boom which is free at one end is subject to rocking or angular movement as can be seen from FIG. 2 including FIGS. 2A and 2B. These figures schematically illustrate a boom B1 of the freestanding type. By the term "freestanding boom", Applicant refers to a boom which is mounted to a prime mover or trailer on one end thereof but having a free end which may move with respect to the ground as the prime mover moves across the ground as can be seen from FIG. 1. While the techniques of the present application are particularly applicable to use with such a freestanding boom, they may also be beneficially used on a boom supported at both ends to accommodate for variations in the image quality that may be caused by, for example, irregularities in the surface of the field in such an application.

Figure 2A:
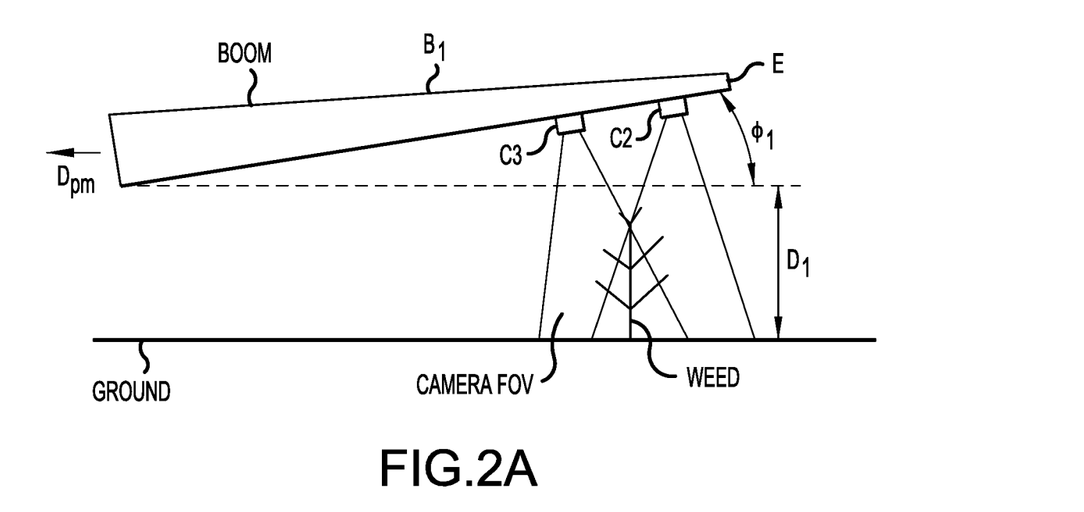
FIG. 2A and FIG. 2B schematically illustrate the boom angle and its relationship on camera or image detector field of view and image perspective vary with respect to boom angle and associated camera height.
Figure 2B:
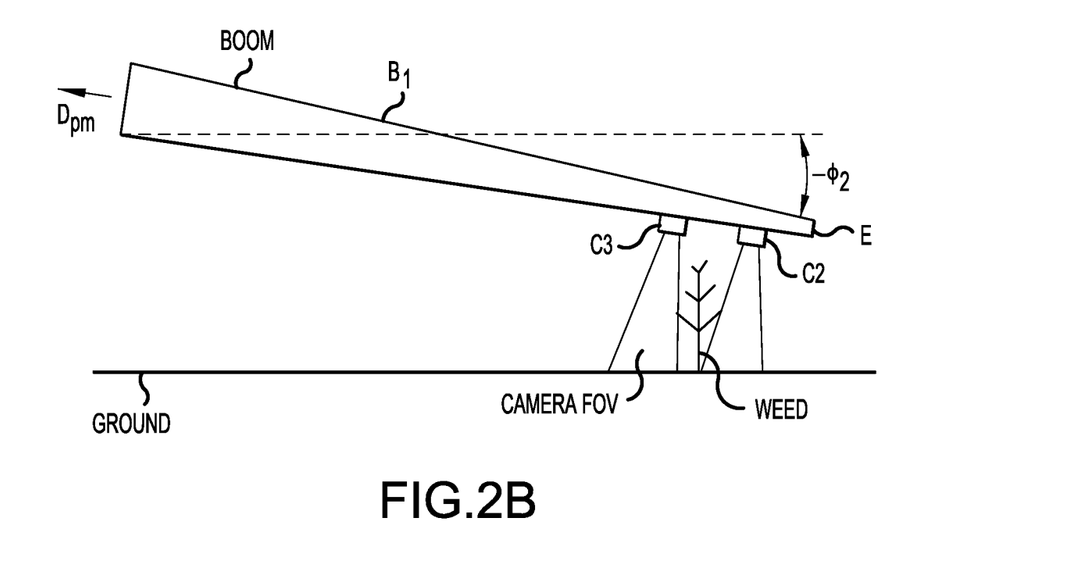

The schematic boom of FIG. 2 extends from the direction of the prime mover $D_{PM}$ to a free end E which is not constrained by wheels or the like a fixed distance from the ground. Such freestanding booms are generally considered more convenient to booms mounted to wheels, and are more easily moved across the field, and are therefore preferred. However, such freestanding booms such as boom $B_1$ of FIGS. 2A and 2B is free to rock with respect to the wheels of the prime mover PM. Thus, the boom varies both with respect to distance and angular direction with respect to horizontal. FIGS. 2A and 2B schematically illustrate the ground which is assumed to be horizontal for the purpose of these figures. The rocking of the boom may cause the boom to vary in height and angle from its design distance $D_1$ with respect to the ground. In FIG. 2A, the beam has tilted an angle $\phi_1$ with respect to horizontal. This positive value of $\phi_1$ causes the cameras to be farther away from the region of interest, in this case a weed, increasing the camera field of view and causing the perspective to tilt generally away from the prime mover. In contrast, when the boom rocks in the other direction, the boom may adopt a negative value of $\phi_2$, placing the camera C3 and its field of view more closely to the region of interest, in this case the weed, and tilting the perspective of this field of view inwardly by the same angle. It is thus apparent that, while boom sprayers are favored in agriculture due to their simplicity and ease of use, such boom sprayers are susceptible to variation of the camera field of view substantially enhancing the difficulty of uniformly defining a region of interest ROI and treating desired points within that region of interest. It is apparent that if the field of view of the camera is uncompensated, the field of view may miss weeds entirely such as in FIG. 2B or falsely trigger due to changes of image size, color and image clarity.

In order to adapt machine vision to effectively operate on such a freestanding boom sprayer, Applicant has determined that the analysis to be performed to identify weeds or the like such as described in the aforementioned copending application, should be performed on a region of interest that is substantially sized invariant. Applicant has determined that regularizing the image information derived from each camera to develop a regularly sized and shaped region of interest for processing to identify desired features is a preferred approach for implementing the system disclosed in the aforementioned copending application. This both increases accuracy and reduces processing time for processing of the region of interest.

The ultrasonic height controller previously known in the art may utilize ultrasonic waves and signal process them to determine the height of the height sensor with respect to the ground. These sensors, in accordance with known techniques, are positioned at the end of the boom and the center of the sprayer. Some broadcast boom sprayers may allow the boom sprayer to alter the height of the center boom section and the height of the boom tip via hydraulics in an attempt to keep the boom level. While such ultrasonic height controllers have limited success in prior art broadcast techniques, the sensors and controllers are useful to ascertain and limit the degree of boom tilt with respect to horizontal and thus may be desirably incorporated into a system produced according to the teachings of the present application.

Figure 3A:
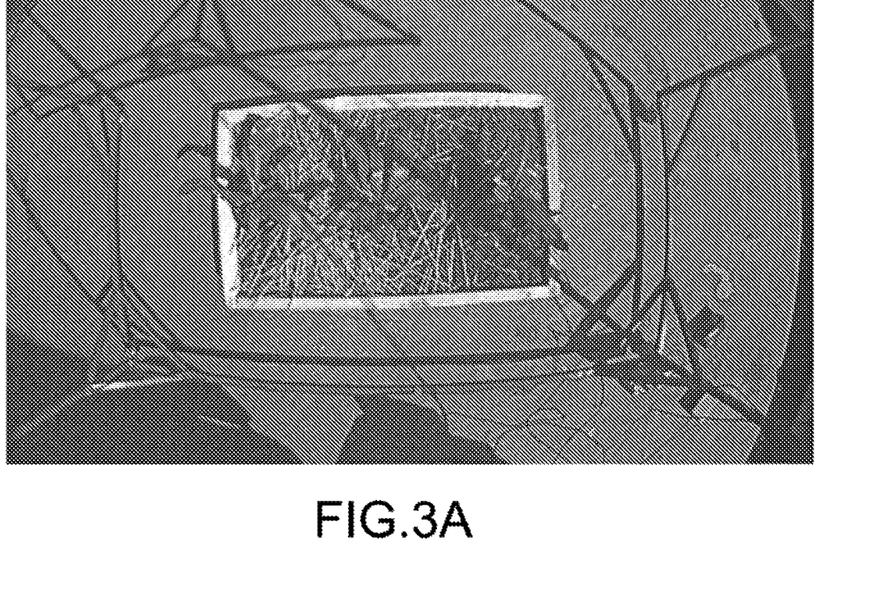
FIGS. 3A and 3B are exemplary photographs (which may correspond to base image data) illustrating the effect of boom angle and related camera height on the size of a ROI, here represented by a rectangular wooden box to show an exemplary ROI.
Figure 3B:
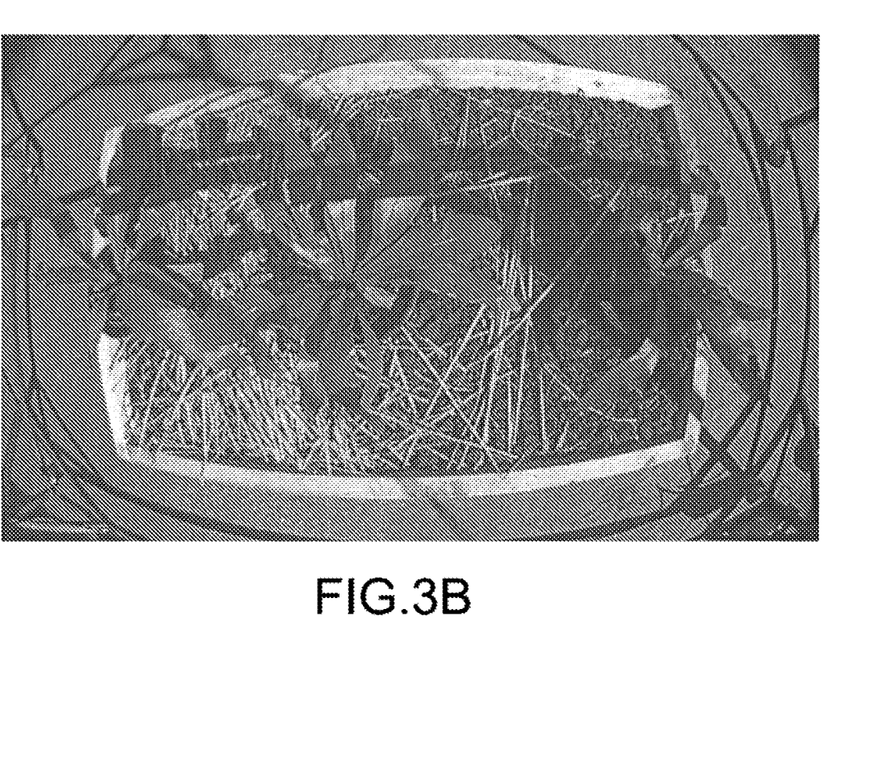

FIGS. 3A and 3B of the present application illustrate the difficulty of monitoring base image data without harmonizing the regions of interest to be at least size, and preferably shape invariant. FIGS. 3A and 3B show the same image, with FIG. 3A illustrating the base image data of a camera such as C3 with camera positioned 1200 mm to the plant base. FIG. 3B illustrates the same area when viewed from a height of 500 mm to plant base. It will be understood that FIG. 3B corresponds to some angle $-\phi_2$ of the boom sprayer whereas FIG. 3A corresponds to some positive angle $\phi_1$ of the same base image data. According to the teachings of the present application, the system determines a value related to either the distance between each camera and ground of the boom angle and uses this value in the processing of the region of interest. This may be determined in a number of different ways as would occur to one of ordinary skill in the art.

In one embodiment, the base of the boom at the center of the prime mover, is at a height that is relatively well known. The tip of the boom is provided with a tip height sensor TIP of FIG. 1. In the illustration of FIG. 1, the tip sensor TIP may be an ultrasonic height sensor which determines the height of the tip. By knowing the location of each camera on the boom, the height of the tip and the height of the boom base, the relative height of each camera with respect to the ground maybe determined utilizing simplified geometry. While this may be adequate in many circumstances, irregularities within the ground may make it desirable to ascertain the height of the boom at more than one location.

Figure 4A:
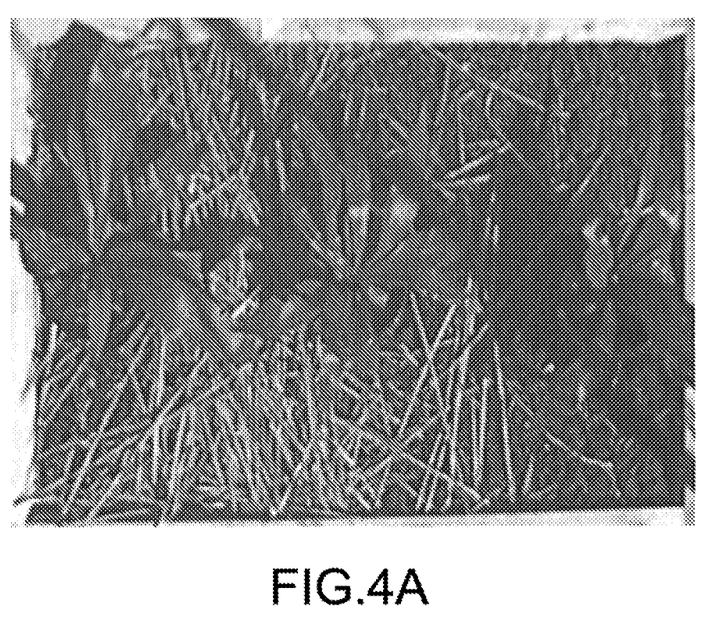
FIGS. 4A and 4B are exemplary photographs (which may correspond to corrected image data) illustrating the correction of size and perspective according to one embodiment of the present application.
Figure 4B:
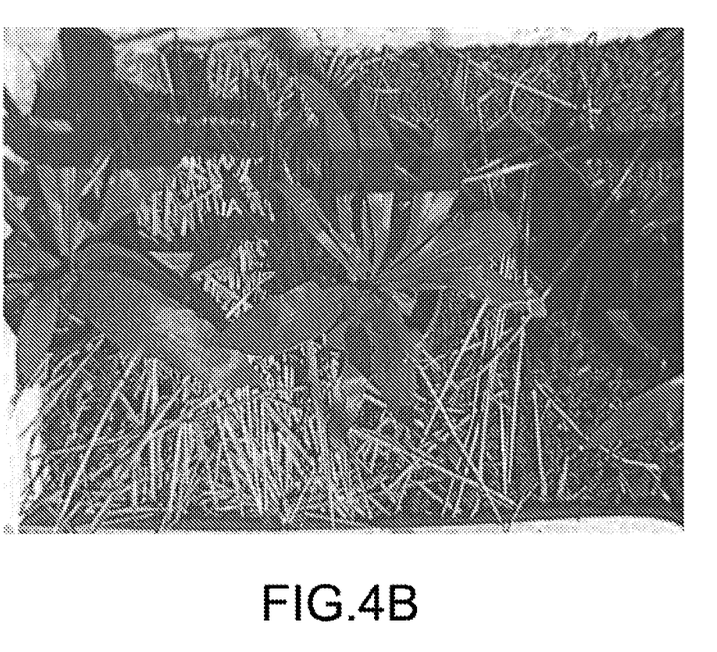

FIGS. 4B and 4A illustrate compensated images corresponding to the base images of FIGS. 3B and 3A regularized to a common region of interest in accordance with the teachings of the present application. This is performed by remapping the base image data into corrected image data, the remapping taking into account the variations in difference in perspective produced by the camera in accordance with the present disclosure. In addition, distortion caused by distortion within the lens of the camera, for example, the barrel distortion particularly illustrated with respect to FIG. 3B may also be corrected. In addition, it is contemplated that some or all of the cameras mounted on the boom may be tilted forwardly or outwardly at a desired angle, for example the angle $\alpha$ of FIG. 1B. Correction of the image data to produce a regularized region of interest backing out the distortion caused by this camera angle may additionally be provided in accordance with the teachings of the present invention.

Figure 5A:
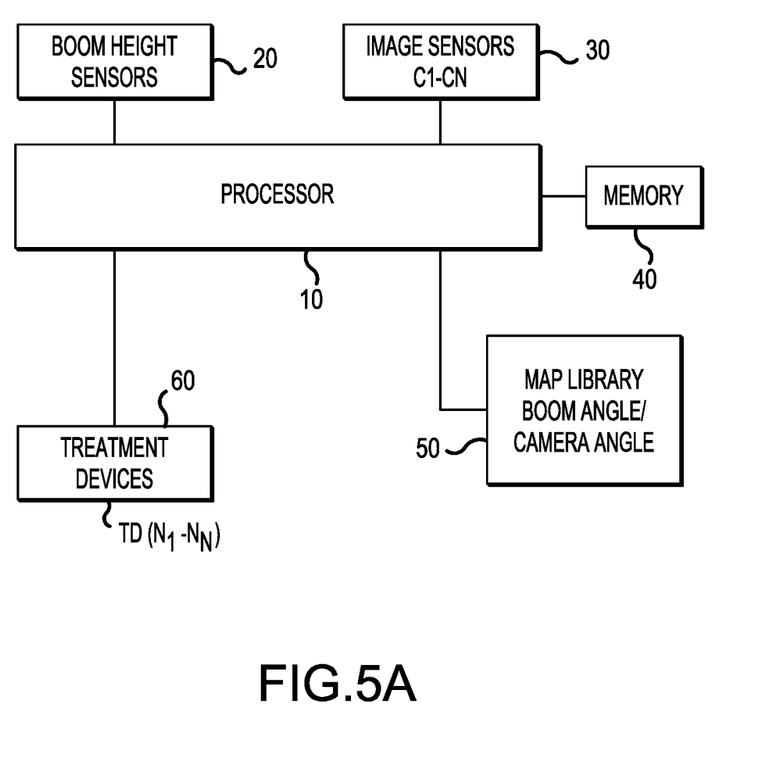
FIG. 5A shows an exemplary system diagram in accordance with the teachings of the present application.
Figure 5B:
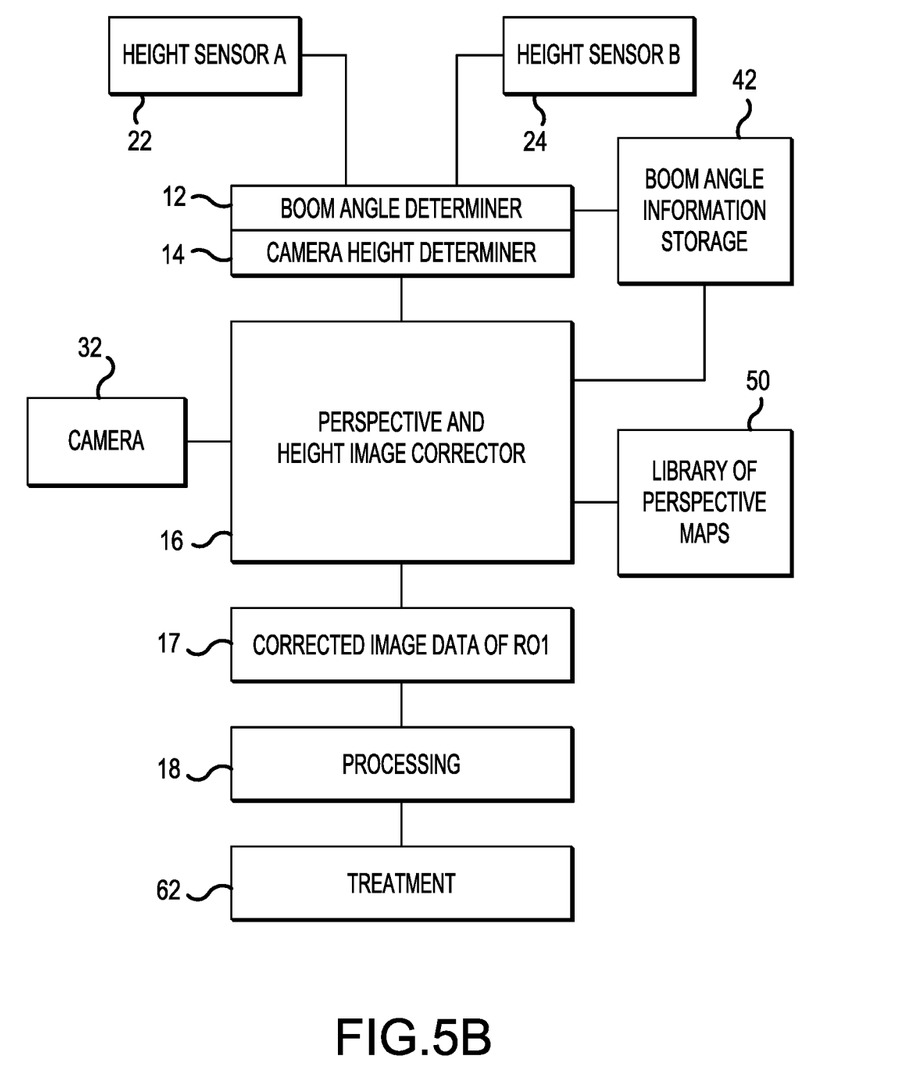
FIG. 5B is a functional hardware diagram wherein the processing of the processor under control of a program stored in memory is represented as discrete hardware elements that may be constructed with one or more processors or with dedicated hardware as would be understood.

FIG. 5B illustrates a schematic hardware representation of an exemplary system of the present application. In FIG. 1, boom height sensors 20 which may include the Tip height sensor TIP or 22 and a center section height sensor 24 of FIG. 1 or any number of additional boom height sensors for correctly measuring the position of the boom at different points with respect to ground, is illustrated as boom height sensors 20. The image sensors or cameras $C_1$-$C_N$(30) both provide information to a processor 16 which may be desirably a general purpose computer processor operating under the operation of a control program stored in the memory 40 associated with the processor. Alternatively, the processor 16 may be a special purpose processor optimized for the intended application as would occur to one of ordinary skill in the art.

Through the use of the programs stored in memory 40, the processor processes the boom height sensor data produced by the boom height sensors 20, the base image data produced by the image sensors 30, under the control of the processing programs stored in memory 40. Once the height of image sensors 20 and the boom tilt angle α are known, the base image sensor data from each of the cameras $C_1$-$C_N$ is converted to corrected image data by the processor 10 utilizing correction data stored in a map library 50, which correction data includes corrections for boom angle, camera angle, difference in height between the camera and ground, and, desirably, any known data for correcting any distortion present in the image sensor optics, for example, the barrel distortion illustrated with respect to FIG. 3B. Thus, the processor produces corrected image data of the region of interest which image data is then utilized in accordance with the teachings of the aforementioned copending application, to produce control signals, typically solenoid actuation signals, for facilitating treatment by the treatment devices 60 which typically include nozzles $N_1$-$N_n$ mounted along the boom.

In accordance with one embodiment of the present application, a pipeline processor such as that disclosed in the afore mentioned copending application is utilized for the processing of the image sensor output to produce signals to drive the treatment devices 60. However, the processor 10 may be a single processor, may be a pipeline processor, or may be a processor dedicated to the correction of the image data and another processor for processing this image data in accordance with the teachings of the aforementioned pending application. In short, processing may be distributed as would occur to one of ordinary skill in the art.

In any event, the processing in accordance with the teachings of the aforementioned copending application may then proceed on corrected image data which includes a regularized image data by remapping the base image data to correct for variations in height, perspective, angle of the camera with respect to ground, and any distortion in the image lens.

It should be appreciated that such a remapping function can be quite processing intensive. Since each camera will capture regions of interest which substantially entirely cover a stripe extended along the direction of travel of the prime mover, many images must be regularized by processing in accordance with the teachings of the present application to produce regions of interest completely covering the area travelled by the boom. This process is beneficially performed by using a library of perspective maps, one corresponding to each combination of 1) a range of heights of the camera with respect to the ground, 2) a range of tilt of the camera with respect to the ground, as well as compensate for barrel distortion and the like which is uniform for each remapping possibility. Thus, when the camera is mounted vertical with respect to the ground, a perspective map remapping each pixel of the base image data to a corresponding corrected image data pixel may be produced for the image sensor when it is 70 cm from the surface, another map may be produced for 80 cm from the surface, and additional maps may be produced all the way to, for example, 120 cm from the surface or the like, to encompass the range of heights and corresponding boom angles likely experienced by the boom during its traversal of the agricultural field.

It is contemplated that cameras or sensors will often be tilted, potentially in two orthogonal directions at the same time. For example, a camera may be tilted forwardly at an angle α as shown in FIG. 1A but may also be tilted outwardly in a direction orthogonal to the direction of travel of the prime mover as an angle β that may be the same as or different from the angle α. It is also within the contemplation of the present application that cameras may be mounted to the boom at different camera mounting positions. For example, some cameras may be mounted at a 90° angle with respect to the horizon in one or both orthogonal directions while other cameras may be mounted at an angle α of 60° with respect to horizontal. It is contemplated that a library of perspective maps will be produced for each substantially different camera mounting position. Thus, if the boom is implemented with some cameras at 90° with respect to horizontal in the direction orthogonal to the direction of travel of the prime mover and some cameras with an angle of 60° with respect to horizontal with respect to the boom in the direction orthogonal to the direction of travel of the prime move, a separate map may be produced for each discreet height range for each camera angle.

It is within the contemplation of the teachings of the present application that the library of perspective maps may be sufficient to encompass all reasonable sensor positions for a given piece of equipment, and thus, in operation, the farmer or operator of the equipment need not produce additional perspective maps during operation of the equipment. Practically speaking, however, the library of perspective maps may include any maps that represent a mounting angle and distance. While an algorithm may be utilized to perform the correction from base image data to corrected image data, the use of a library of perspective maps has the benefit of requiring less processing, and additionally being able to correct the image data for not only camera angle and camera height and perspective changes, but additionally for barrel or other distortion of the camera lens without adding substantial real time computational complexity. It should be understood that each perspective map describes pixel displacement and scaling between the base image data and corrected image data as is generally known in the image processing art to process image data using a mapping function.

As can be seen from a review of FIGS. 2A and 2B, the camera field of view may shift with respect to the region of interest due to the angle φ of the boom. For this reason, it is desirable that the camera field of view be substantially greater than the region of interest so that the region of interest remains within the camera field of view for all anticipated angles of φ. Thus, it may be beneficial to map the base image data to corrected image data so that the corrected image data encompasses only the region of interest discarding pixels of the base image data outside the region of interest, to simplify processing in accordance with the teachings of the aforementioned co-pending Rees application.

Desirably, the conversion of the base image data to corrected image data also converts the data to a bird's eye view where all pixels are viewed from a point of view completely vertical. This produces a bird's eye view producing a linear representation of the objects in the image even if the base image data is for a camera that is tilted by an angle α and an angle β that are both non-zero. By producing this bird's eye view with regularized image size, the region of interest may be efficiently characterized. The functions changing the perspective of an image may be calculated in accordance with the teachings of present invention. However, it is preferable to perform a simple remapping function, as this produces substantially less processing load and may be accomplished with less processing resources and time. Thus, it is preferred according to the teachings of the present application, to remap based on the library of perspective images rather than to calculate the pixel remapping.

While one embodiment of the present application may map the base image data into corrected image data using the height of the image sensor, the remap function may also accommodate remapping of perspective based on the angle feed of the boom. Thus, for example, individual maps might be stored for V=−3°, V=−2.5°, . . . V=+2.5°, V=+3°. Each angle may then have a map generated that can be reused to remap the perspective of the image to bird's eye perspective at that angle and at the calculated height of the camera. These maps will generally include distortion correction to correct for a camera lens distortion as previously mentioned. Such a camera sensor and lens distortion correction can correct the barrel distortion visible in FIG. 3 which causes the wooden box to appear curved. In accordance with the teachings of the present invention, the lens and sensor distortion and the perspective distortion may be performed by separate remaps, or may be combined to perform a single remap, thereby rendering processing more efficient.

After the maps are obtained, and after the system is operating, the system of the present application may perform in accordance with the embodiment of FIG. 5B. In accordance with FIG. 5B, height sensor A 22 and height sensor B 24 are known distances on either ends of the boom. For example, height sensor A may be the tip sensor 22 of FIG. 1 whereas height sensor B may be the center section sensor 24 of FIG. 1. Alternatively, the height sensor B may simply generate the known fixed height of the center of the boom. By knowing the length of the boom, and the height of the two ends of the boom, the boom angle may be calculated by a boom angle determiner 12. This boom angle may determine the boom angle to utilize ascertaining the boom angle information from boom angle information storage 42. Through the use of the boom angle and the, the heights of height sensor A and height sensor B, the camera height may be determined by the camera height determiner 14. In this manner, the displacement of the camera with respect to the ground, and the variations in perspective may be ascertained.

In accordance with the teachings of the present application, a Perspective and Height Image Corrector 16 receives the camera image as base image data from each camera 32 and converts this camera base image data into corrected camera image data using an appropriate perspective map representing the combination of the height of the camera, and the boom angle which demonstrates the perspective of the base image data. As previously mentioned, and in accordance with the teachings of the present application, the camera mounting angle may also be accommodated by the image library and thus, a camera angle of for example 90°, as compared to 60° may be used to select the appropriate perspective image map from the library of perspective maps. The Perspective and Height Image Corrector 16 may be then used to produce Corrected Image Data of the ROI (region of interest) 17 associated with the camera 32 which is then used to process this image to detect areas for treatment in the Processing 18 and then treat these areas by Treatment 62. The Processing at element 18 of FIG. 5B may be the Processing disclosed in Applicant's co-pending application described herein. Similarly, the Treatment may be performed in accordance with the techniques disclosed in this copending application.

It should be understood that the boom height sensors utilized in accordance with the teachings of the present application may be any suitable form of boom height sensor. As previously mentioned, one form of boom height sensor is ultrasonic distance measurement device, such as those utilized for conventional boom height adjustment purposes. Alternatively, it is within the contemplation of the present application to use alternative boom height measurement devices, such as a stereoscopic depth device.

Figure 6:
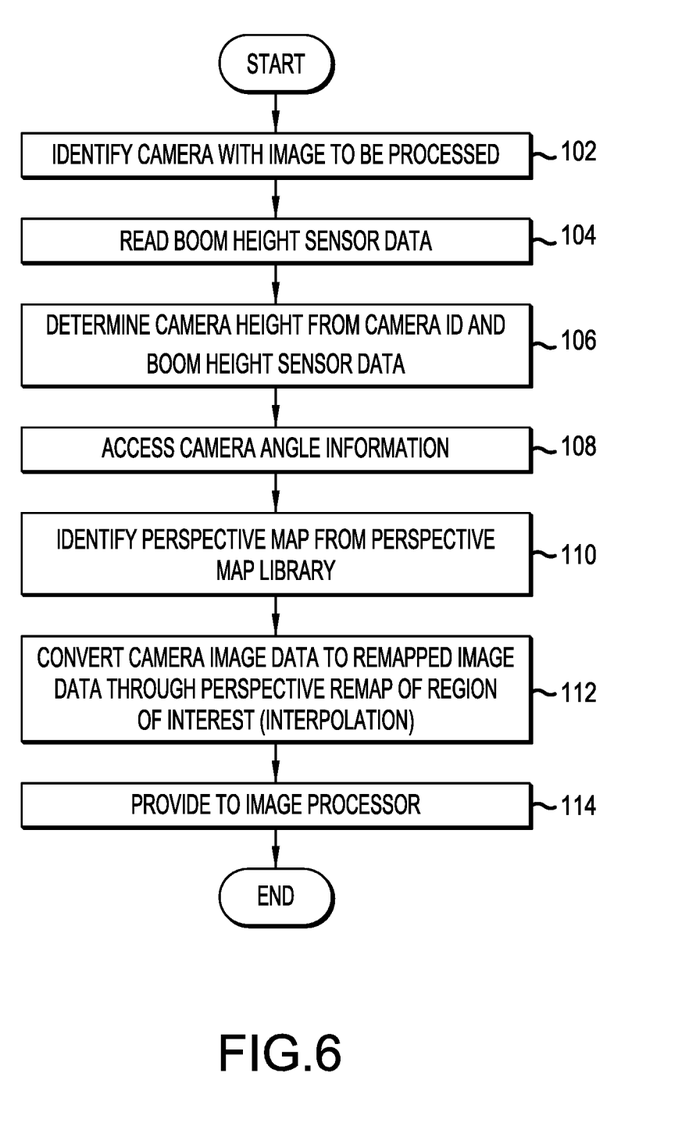
FIG. 6 shows an exemplary simplified flow chart to be run by the processor illustrated in FIG. 5 in accordance with one embodiment of the present application.

FIG. 6 illustrates a flowchart of operation of the processor of FIG. 5A. At step 102, the camera image to be processed is identified. At step 104, the boom height sensor data is read. At step 106, the camera height is determined from the camera ID and the boom height sensor data. At step 108, the camera angle information is accessed as this information is known from the manufacturer of the boom system produced according to the teachings of the present application or alternatively may be entered by the user during prior system configuration. From the camera height and boom height sensor area, and from the camera angle, the perspective map from the perspective map library is identified in Step 110. At step 112, the base image data from the camera is remapped to corrected image data through a perspective remap, to produce corrected image data of the region of interest. It is within the contemplation of the present application that step 112 may interpolate the values of adjacent pixels of the raw image data to produce corrected image data, should interpolation be desirable. Such interpolation is performed as would occur to one of ordinary skill in the art of image procession.

The Remapped Region of Interest produces Converted Image Data that is then used by further image processing to identify and treat areas of interest corresponding to features detected in the image data as explained in the above identified copending Rees application. Thus process of FIG. 6 is performed for each camera in each region of interest and the information is then provided to the processor to determine and treat features of interest as is described in Applicant's co-pending application described herein.

Figure 7:
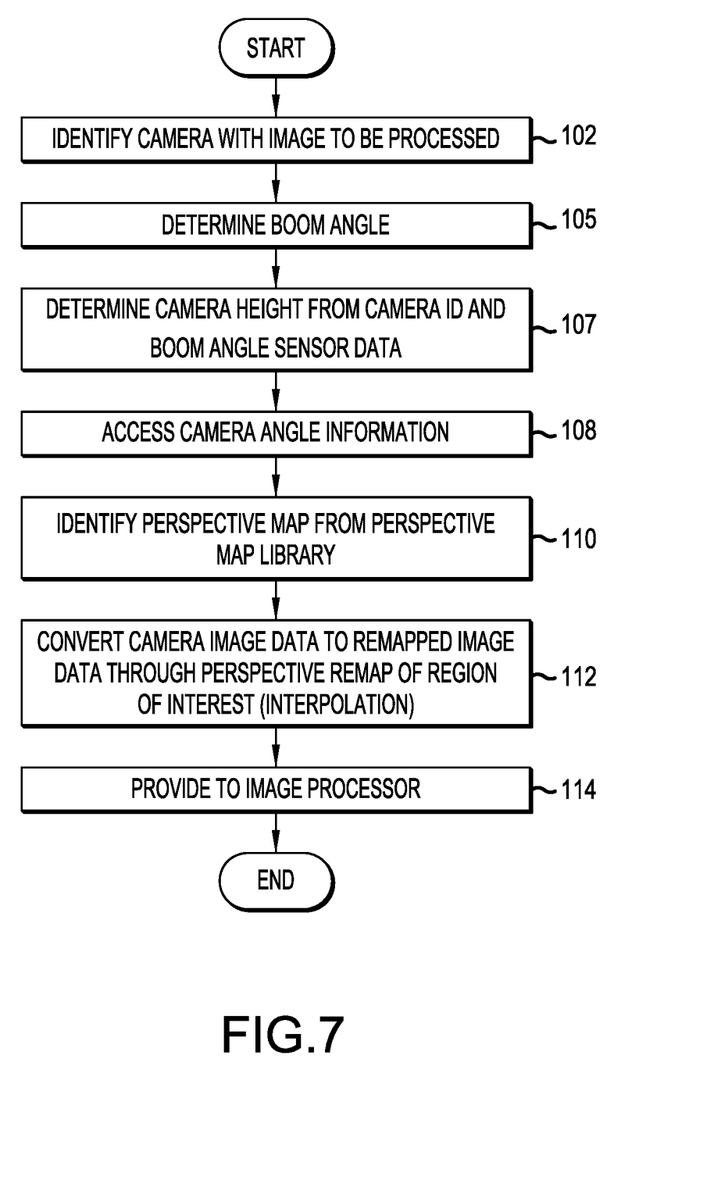
FIG. 7 describes an alternative processing flow where the system utilizes boom angle data to ascertain the appropriate Perspective Map from the Perspective Map Library.

FIG. 7 describes an alternative processing flow where the system, rather than determining the perspective map from camera height and camera angle information, reads boom angle data ascertains at step 105 boom angle information and then based on that boom angle information in the identified camera, determines camera height, camera ID, and boom angle at step 107. This information is then used with the camera angle information obtained at step 108 and identify the perspective map from the perspective map library ant step 110, using not only ascertained camera height and camera angle, but additionally by ascertaining boom angle to better ascertain camera perspective to compensate for camera perspective variations in the image data.

From the foregoing, it is apparent that the corrected image data produced by remapping the image data into regularized image data of the region of interest substantially simplifies the after processing of this image data and compensates for changing camera height and perspective created by the movement of the boom as the treatment device travels across an agricultural field. It should be apparent from the foregoing disclosure that the system of the present application, in one preferred embodiment, is performed by a general purpose digital computer under control of software stored in memory, which software causes the selection of an appropriate perspective map to remap the base image data to corrected image date to regularize the image data of a region of interest to enable its accurate processing for identification of features therein in treatment in accordance with the teachings of Applicant's co-pending application. However, as would occur to one of ordinary skill in the art, this regularization of the image may be performed with a dedicated processor performing the same functions as would occur to one of ordinary skill in the art. It is apparent that variations to the implementation of the teachings of the present application as would have occurred to one of ordinary skill in the art may be made without departing from the spirit and scope of the present invention. Such variations are within the intended scope of the present application.

The invention claimed is:

1. In an agricultural machine vision system for treatment of an agricultural field using a boom extending away from a tractor and having one or more image sensors mounted on the boom and having a boom angle and boom height susceptible to variation as the agricultural machine travels across a field, a method of treating the images produced by the one or more image sensors to simplify location of features within a region of interest (ROI) in the field comprising:
   ascertaining the boom angle of the boom supporting the one or more image sensors with respect to a field surface of the field;
   receiving base image data including a base multipixel image file depicting the multipixel image area of the ROI obtained from the one or more image sensors; and
   correcting the base image file by remapping the image data including the multipixel image area into a corrected multipixel image file representing the ROI in said agricultural field to correct for movement of the base image data with respect to location and apparent size of the ROI caused by boom tilt; and
   locating features in the corrected multipixel image file and treating these located features in the agricultural field.

2. The method of treating of claim 1 wherein said correcting corrects the image of the ROI including the base image file of successive images produced by said one or more image sensors into a corrected multipixel image file that is size invariant so that each image represents the ROI with the corrected multipixel image file and/or
   corrects the size and/or perspective of the image of the ROI including the base image file to produce said corrected multipixel image file.

3. The method of treating of claim 2 wherein tilt of the boom as it varies in height with respect to the surface of the field moves the center of the base multipixel image file received from the image sensor and correspondingly moves the ROI of the base image data,
   the correcting performing remapping of the base image data into corrected image data to place the region of interest (ROI) in a desired location of the corrected image data.

4. The method of claim 2 wherein said ROI is located wholly within said corrected multipixel image file by said correcting and/or
   wherein said corrected multipixel image file is corrected to provide birds eye perspective image data of the ROI representing the image information from the perspective of an infinite distance along a perpendicular from a plane of the field.

5. The method of treating of claim 1 wherein tilt of the boom as it varies in height with respect to the surface of the field moves the center of the base multipixel image file received from the image sensor to produce the corrected multipixel image file having a corrected center of the ROI,
   the correcting performing remapping of the base image data including the base image multipixel date file into the corrected multipixel image file to locate the region of interest (ROI) in a desired location of the corrected image data.

6. The method of claim 5 wherein said ROI is located wholly within said corrected multipixel image file by said correcting and/or
   wherein said corrected multipixel image file is corrected to provide birds eye perspective image data of the ROI representing the image information from the perspective of an infinite distance along a perpendicular from a plane of the field.

7. The method of claim 1 wherein the agricultural field extends in a field plane and said ROI is located wholly within said corrected multipixel image file by said correcting and/or
   wherein said corrected multipixel image file is corrected to provide birds eye perspective multipixel image data of the ROI representing the image information from the perspective of an infinite distance along a perpendicular from the field plane.

8. The method of treating of claim 1 wherein the image data includes digital multipixel image data of in the base image data, the method further comprising:
   providing said agricultural machine vision system with a perspective map library providing remapping information for remapping the multipixel information of said base multipixel image file for different image sensor mounting angles, perspective change and/or distances between the image sensor and the field surface, the perspective map library including plural correction maps, each correction map providing correction information for a different boom angle, sensor offset angle and/or distance of said image sensor from the field surface.

9. The method of treating of claim 8 wherein one correction map is selected for each boom angle, sensor offset angle and distance of said image sensor from the field surface and/or
   wherein said correction map also corrects for lens distortion.

10. The method of claim 8 wherein said correcting includes,
    selecting a selected correction map having the closest match to the angle determined in said ascertaining;
    converting said base multipixel image file into a corrected multipixel image file using said selected correction map.

11. The method of claim 8 wherein one angle correction map is selected for each different image sensor mounting angle and one boom angle correction map is selected for each boom angle to correct for change in perspective and size caused by the boom orientation.

12. The method of claim 8 wherein said correcting includes, selecting a selected boom angle correction map having the closest match to the determined boom angle in said ascertaining, selecting an angle correction map for the image sensor mounting angle; and converting said base image data including the base multipixel image file into a corrected multipixel image file using said selected angle correction map and said boom angle correction map.

13. The method of claim 8 wherein said converting based on said boom angle correction map is performed on the base image data including the base multipixel image file of said base image separately from converting using said angle correction map, and/or wherein at least one of said boom angle correction map and said angle correction map also corrects for lens distortion.

14. The method of claim 8 wherein said step of ascertaining is achieved by, determining height of the boom at two points of the boom, and calculating the angle of the boom from the height of the boom at said two points.

15. An agricultural machine vision system for use in treatment of an agricultural field, the agricultural machine vision system being used in agricultural equipment including a treatment boom mounted on a tractor, the boom angle and boom height being susceptible to variation as the agricultural machine travels across a field, comprising:

one or more image sensors mounted on the boom and producing base image data;

a boom angle detector for detecting a boom tilt angle with respect to a field surface of the field;

a processor and memory configured to collect the base image data including a base multipixel image file as obtained from the one or more image sensors and to correct this base multipixel image file by remapping the base image data into corrected image data including a corrected multipixel image data file of a region of interest (ROI) of said agricultural field to correct for movement of the base image data with respect to location and apparent size of the ROI caused by boom tilt; and identifying features in the corrected multipixel image file and treating these identified features in the corrected multipixel image file.

16. The system of claim 15 wherein tilt of the boom as it varies in height with respect to the surface of the field moves the center of the base multipixel image file received from the one or more image sensors and correspondingly moves the ROI of the base image data, the processor remapping the base image data into corrected image data producing a remapped corrected multipixel image file to place the region of interest (ROI) in a desired location of the corrected multipixel image file.

17. The system of claim 15 wherein said corrected multipixel image file is corrected to provide birds eye perspective image data of the ROI representing the image information from the perspective of an infinite distance along a perpendicular from a plane of the field.

18. The system of claim 15 wherein the image data includes a base multipixel image file of pixels in the base image data, wherein said one or more image sensors are mounted at different image sensor mounting angles with respect to the direction of travel of said tractor to provide a desired offset of said ROI to said boom in the direction of travel;

wherein said memory stores a perspective map library providing remapping information for remapping pixel information of said base image data including the base multipixel image file for different image sensor mounting angles, and perspective change and/or distances between the one or more image sensors and the field surface produced by different tilt angles, the perspective map library including plural correction maps, each correction map providing correction information for a different boom angle, sensor offset angle and/or distance of a said image sensor from the field surface.

19. The system of claim 15 configured to treat the images produced by the one or more image sensors to simplify location of features within a region of interest (ROI) in the field by;

ascertaining the boom angle of the boom supporting a said image sensor with respect to a field surface of the field;

receiving base image data including the base multipixel image file from said base image sensor; and correcting the base image data from the image sensor by remapping the base multipixel image file into corrected image data including the corrected multipixel image file which includes the ROI of said agricultural field to correct for movement of the base image data with respect to location and apparent size of the ROI caused by boom tilt.

* * * * *